(12) United States Patent
Libby et al.

(10) Patent No.: US 10,886,777 B1
(45) Date of Patent: Jan. 5, 2021

(54) REDUNDANT DC INPUT POWER SUPPLIES HAVING BACK-FEED PROTECTION

(71) Applicant: Astec International Limited, Kowloon (HK)

(72) Inventors: Rochie Ligaya Sedillo Libby, Metro Manila (PH); Neil Maderas Reyes, Metro Manila (PH); Khanderao Madhav Gaikwad, Metro Manila (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 16/600,929

(22) Filed: Oct. 14, 2019

(51) Int. Cl.
*H02J 9/06* (2006.01)
*H02M 3/145* (2006.01)

(52) U.S. Cl.
CPC .............. *H02J 9/061* (2013.01); *H02M 3/145* (2013.01)

(58) Field of Classification Search
CPC ........................................................ H02J 9/061
USPC ........................................................... 307/64
See application file for complete search history.

(56) References Cited

U.S. PATENT DOCUMENTS

| | | | | |
|---|---|---|---|---|
| 4,829,198 A | * | 5/1989 | Maley | ............... H03K 19/0075 326/10 |
| 2015/0162740 A1 | * | 6/2015 | Barnes | ................ H02H 1/0015 361/63 |

OTHER PUBLICATIONS

Diodes Incorporated, Document No. DS40000 Rev. 2-2. ZXGD3114N7, Oct. 2018, 11 pages, www.diodes.com.

* cited by examiner

*Primary Examiner* — Joseph Chang

(57) ABSTRACT

A back-feed protection circuit includes input circuits and a control circuit. Each input circuit includes an input for receiving an input DC voltage. The control circuit is configured to enable one of the first input circuit and the second input circuit having the highest input DC voltage, and disable the other input circuit to substantially prevent current from back feeding to the first input circuit and/or the second input circuit. Each input circuit additionally and/or alternatively includes a positive rail, a reference rail and a plurality of switching devices. A set of the switching devices are coupled in series in the positive rail of each input circuit, and another set of the switching devices are coupled in series in the reference rail of each input circuit. Other example back-feed protection circuits, and electric power supplies including back-feed protection circuits are also disclosed.

21 Claims, 9 Drawing Sheets

REDUNDANT DC INPUT POWER SUPPLIES HAVING BACK-FEED PROTECTION

FIELD

The present disclosure relates to redundant DC input power supplies having back-feed protection during, for example, single and/or double fault conditions.

BACKGROUND

This section provides background information related to the present disclosure which is not necessarily prior art.

Power supplies commonly include redundant ORing inputs having back-feed protection. For example, each of the inputs may include diodes, relays or MOSFETs coupled in series along its positive and reference rails for providing back-feed protection. When relays are employed, the power supply includes bulk capacitors having large hold-up capabilities to sustain the power supply's output when transferring from one input to another input. When MOSFETs are employed, each MOSFET is controlled with its own controller based on a drain-source voltage across the MOSFET

SUMMARY

This section provides a general summary of the disclosure, and is not a comprehensive disclosure of its full scope or all of its features.

According to one aspect of the present disclosure, an electric power supply includes a first input circuit, a second input circuit, a power conversion circuit and a control circuit. The first input circuit includes a positive rail, a reference rail and a plurality of first switching devices. The positive rail and the reference rail of the first input circuit define an input for receiving a first input DC voltage. The plurality of first switching devices include a first set of switching devices and a second set of switching devices. The first set of switching devices are coupled in series in the positive rail of the first input circuit. The second set of switching devices are coupled in series in the reference rail of the first input circuit. The second input circuit includes a positive rail, a reference rail and a plurality of second switching devices. The positive rail and the reference rail of the second input circuit define an input for receiving a second input DC voltage. The plurality of second switching devices including a first set of switching devices and a second set of switching devices. The first set of switching devices are coupled in series in the positive rail of the second input circuit. The second set of switching devices are coupled in series in the reference rail of the second input circuit. The power conversion circuit is coupled to the first input circuit and the second input circuit. The control circuit is configured to sense the first input DC voltage and the second input DC voltage, enable one of the first input circuit and the second input circuit having the highest input DC voltage, and disable the other one of the first input circuit and the second input circuit to substantially prevent current from back feeding to the first input circuit and/or the second input circuit.

According to another aspect of the present disclosure, a back-feed protection circuit for coupling to a power conversion circuit is disclosed. The back-feed protection circuit includes a first input circuit, a second input circuit and a control circuit. The first input circuit includes a positive rail, a reference rail and a plurality of first MOSFETs. The plurality of first MOSFETs includes a first set of MOSFETs coupled in series in the positive rail of the first input circuit, and a second set of MOSFETs coupled in series in the reference rail of the first input circuit. The second input circuit includes a positive rail, a reference rail and a plurality of second MOSFETs. The plurality of second MOSFETs includes a first set of MOSFETs coupled in series in the positive rail of the second input circuit, and a second set of MOSFETs coupled in series in the reference rail of the second input circuit. The control circuit is coupled to the first input circuit and the second input circuit for controlling the plurality of first MOSFETs and the plurality of second MOSFETs. The control circuit is configured to enable the first input circuit or the second input circuit by turning on the plurality of first MOSFETs or the plurality of second MOSFETs, and disable the other one of the first input circuit and the second input circuit to substantially prevent current from back feeding to the first input circuit and/or the second input circuit.

According to yet another aspect of the present disclosure, a back-feed protection circuit for coupling to a power conversion circuit is disclosed. The back-feed protection circuit includes a first input circuit, a second input circuit and a control circuit. The first input circuit includes an input for receiving a first input DC voltage. The second input circuit includes an input for receiving a second input DC voltage. The control circuit is coupled for controlling the first input circuit and the second input circuit. The control circuit is configured to sense the first input DC voltage and the second input DC voltage, enable one of the first input circuit and the second input circuit having the highest input DC voltage, and disable the other one of the first input circuit and the second input circuit to substantially prevent current from back feeding to the first input circuit and/or the second input circuit.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
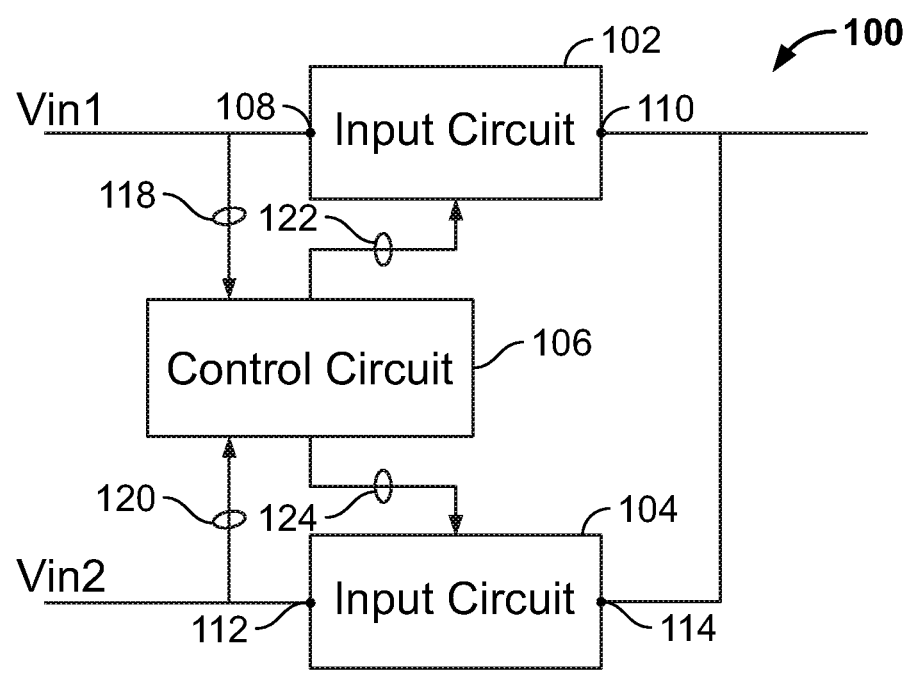
FIG. 1 is a block diagram of a back-feed protection circuit including two redundant input circuits and a control circuit that enables one of the input circuits, and disables the other input circuit, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A back-feed protection circuit for coupling to a power conversion circuit according to one example embodiment of the present disclosure is illustrated in FIG. 1 and indicated generally by reference number 100. As shown in FIG. 1, the back-feed protection circuit 100 includes input circuits 102, 104 and a control circuit 106 coupled for controlling the input circuits 102, 104. The input circuit 102 includes an input 108 for receiving an input DC voltage Vin1 and an output 110, and the input circuit 104 includes an input 112 for receiving an input DC voltage Vin2 and an output 114. The control circuit 106 senses the input DC voltages Vin1, Vin2, enables one of the input circuits 102, 104 having the highest input DC voltage, and disables the other one of the input circuits 102, 104.

By enabling one of the input circuits 102, 104 and disabling the other one of the input circuits 102, 104, current may be substantially prevented (e.g., prohibited in some examples) from back feeding to the input circuit 102 and/or the second input circuit 104. As such, user(s) may avoid exposure of hazardous current and/or voltages when servicing one of the power sources providing power to its corresponding input 108, 112. This may be useful during, following, etc. fault conditions such as single fault conditions, double fault conditions, etc.

The input circuits 102, 104 of FIG. 1 and the other combination of input circuits disclosed herein are redundant input circuits having an ORing functionality. For example, one input circuit (e.g., the input circuit 102) may be coupled to a primary power source (e.g., a grid, etc.), and the other input circuit (e.g., the input circuit 104) may be coupled to a backup power source (e.g., one or more batteries, photovoltaics cells, etc.). During normal operation, the input circuit coupled to the primary power source may receive a higher input voltage than the input circuit coupled to the backup power source. In such examples, the input circuit coupled to the primary power source is enabled, and the input circuit coupled to the backup power source is disabled to substantially prevent current from back feeding to the input circuit 102 and/or the second input circuit 104. In some instances, the input voltage of the primary power source may be lost, reduce, etc., or the input voltage of the backup power source may increase. In such examples, the control circuit 106 may automatically enable the input circuit coupled to the backup power source, and disable the input circuit coupled to the primary power source to substantially prevent current from back feeding to the input circuit 102 and/or the second input circuit 104.

As explained above, the control circuit 106 senses the input DC voltages Vin1, Vin2, and then enables and/or disables the input circuits 102, 104 based on the sensed input DC voltages Vin1, Vin2. For example, and as shown in FIG. 1, the control circuit 106 receives signals 118, 120 representing the sensed DC voltages Vin1, Vin2, and compares the sensed DC voltages Vin1, Vin2 to determine which voltage is greater. The control circuit 106 may then enable the input circuit (e.g., the active input circuit) receiving the highest DC voltage, and disable the other input circuit. As shown in FIG. 1, the control circuit 106 may provide signals 122, 124 to enable and/or disable the input circuits 102, 104.

The control circuit 106 may enable and/or disable the input circuits 102, 104 as long as one input DC voltage is greater than the other input DC voltage. In some examples, there may be a minimal difference between the input DC voltages Vin1, Vin2 voltages. As such, transferring between which input circuit is active (e.g., enabled) and which input circuit is inactive (e.g., disabled) may be based solely on which input circuit is receiving the higher input DC voltage. This ensures the enabled input circuit (e.g., the input circuit 102) experiences minimal dissipation when conducting current to the power conversion circuit (not shown).

In other examples, a defined threshold may be required before transferring between which input circuit is active and which input circuit is inactive. For example, the control circuit 106 may enable one of the input circuits 102, 104 only when its input DC voltage is at most 2 volts greater than the input DC voltage of the other input circuit. In other words, one of the input circuits 102, 104 may be enabled only when the difference (e.g., delta) between the input DC voltages is 2 volts or less. For example, the DC voltage Vin1 may be 262 VDC and the DC voltage Vin2 may be 260 VDC. In such examples, the control circuit 106 may enable the input circuit 102, and disable the input circuit 104. This ensures the active input circuit is conducting the majority of the input current for the power conversion circuit.

The control circuit 106 may disable one input circuit 102, 104 based on signals provided to the other input circuit 102, 104. For example, the control circuit 106 may disable the input circuit 104 based on the signal 122 (e.g., an enabling signal) provided to the input circuit 102. In other examples, the input circuit 104 may be disabled when signals for controlling switching devices in the input circuit 102 are detected, as further explained below.

The back-feed protection circuit 100 may be coupled to a power conversion circuit (now shown). For example, and as shown in FIG. 1, the outputs 110, 114 of the redundant input circuits 102, 104 are coupled in parallel. The parallel-coupled outputs 110, 114 may be coupled to the power conversion circuit.

Figure 2:
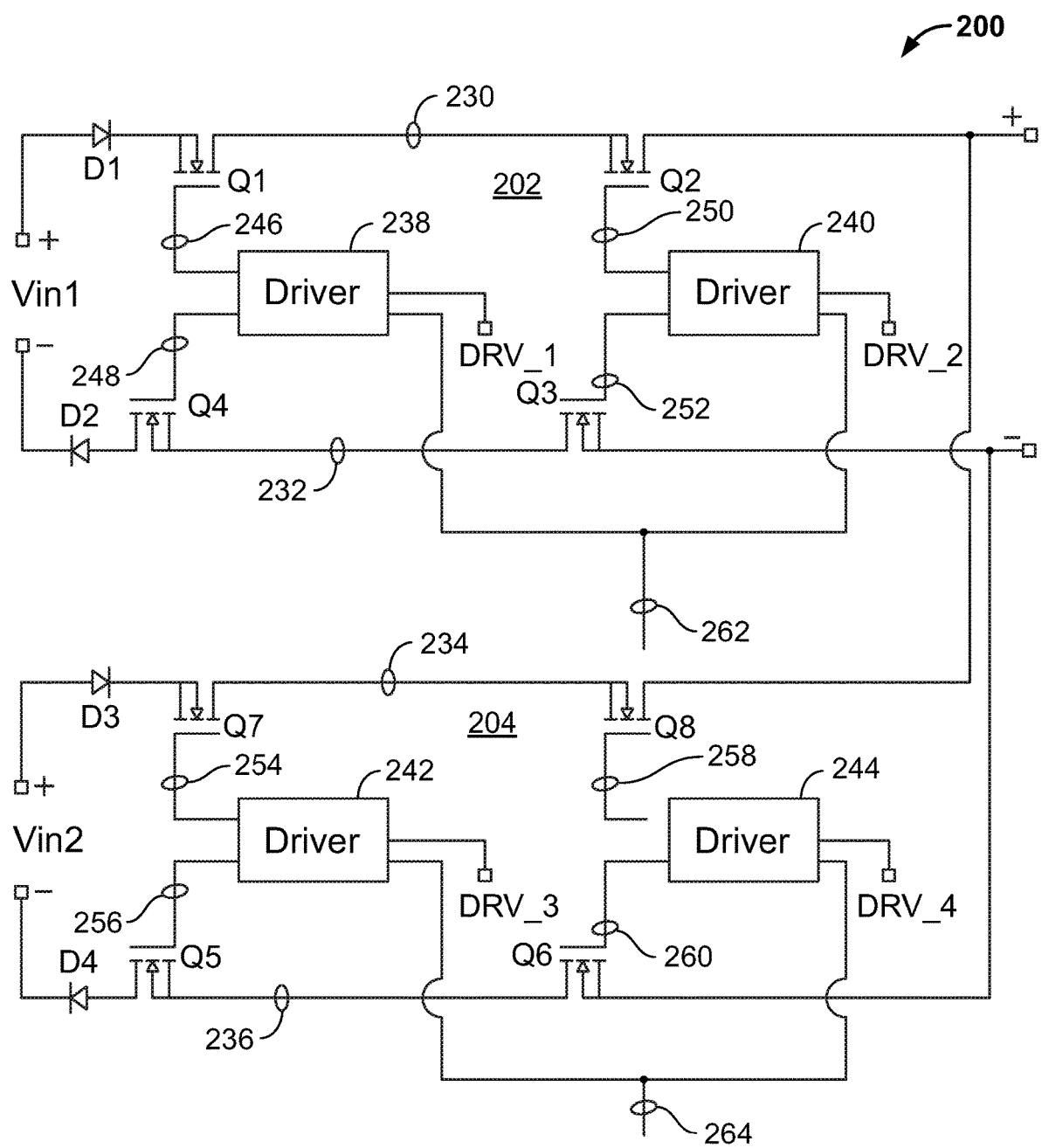
FIG. 2 is a schematic of a back-feed protection circuit including two redundant input circuits each having four MOSFETs, and a control circuit for controlling the MOSFETs, according to another example embodiment.

In some embodiments, the input circuits 102, 104 and/or the other input circuits disclosed herein may include switching devices such as N-channel MOSFETs, P-channel MOSFETs, etc. For example, FIG. 2 illustrates a back-feed protection circuit 200 including redundant input circuits 202, 204 each having multiple N-channel MOSFETs for providing back-feed protection. Specifically, and as shown in FIG. 2, the input circuit 202 includes a positive rail 230, a reference rail 232, four MOSFETs Q1-Q4 and diodes D1, D2, and the input circuit 204 includes a positive rail 234, a reference rail 236, four MOSFETs Q5-Q8, and diodes D3, D4. The positive rails 230, 234 and the negative rails 232, 236 of the input circuits 202, 204 define inputs for receiving DC input voltages Vin1, Vin2.

In the particular example of FIG. 2, the MOSFETs Q1, Q2 and the diode D1 are coupled in series in the positive rail 230, and the MOSFETs Q3, Q4 and the diode D2 are coupled in series in the reference rail 232. Likewise, the MOSFETs Q7, Q8 and the diode D3 are coupled in series in the positive rail 234, and the MOSFETs Q5, Q6 and the diode D4 are coupled in series in the reference rail 236.

The diodes D1-D4 of FIG. 2 may provide redundant back-feed protection. For example, the diodes D1-D4 may provide back-feed protection when one or more of the MOSFETs Q1-Q8 are improperly turned on. As such, the diodes D1-D4 are optional components that may be moved, removed and/or replaced with other switching devices in other examples, as further explained below.

Additionally, the back-feed protection circuit 200 includes a control circuit coupled to the input circuits 202, 204 for controlling the MOSFETs Q1-Q8. For example, and as shown in FIG. 2, the control circuit includes four isolated drivers 238, 240, 242, 244 for controlling the MOSFETs Q1-Q8. As shown, the drivers 238, 240, 242, 244 receive drive signals DRV_1, DRV_2, DRV_3, DRV_4 generated by the control circuit, and provide control signals 246, 248, 250, 252, 254, 256, 258, 260 for controlling the MOSFETs Q1-Q8.

As shown in FIG. 2, two drivers are associated with each input circuit 202, 204. For example, the drivers 238, 240 are coupled for controlling the MOSFETs Q1-Q4 of the input circuit 202, and the drivers 242, 244 are coupled for controlling the MOSFETs Q5-Q8 of the input circuit 204. In such examples, each driver 238, 240, 242, 244 controls one MOSFET in a positive rail and one MOSFET in a reference rail based on one common drive signal. For example, the driver 238 generates the control signals 246, 248 for the MOSFETs Q1, Q4 based on the common drive signal DRV_1, and the driver 240 generates the control signals 250, 252 for the MOSFETs Q2, Q3 based on the common drive signal DRV_2. Likewise, the driver 242 generates the control signals 254, 256 for the MOSFETs Q7, Q5 based on the common drive signal DRV_3, and the driver 244 generates the control signals 258, 260 for the MOSFETs Q8, Q6 based on the common drive signal DRV_4.

In the example of FIG. 2, the control circuit may generate one or more signals 262, 264 for enabling and/or disabling the drivers 238, 240, 242, 244. For example, and as shown in FIG. 2, the control circuit generates the signal 262 for the drivers 238, 240 associated with the input circuit 202, and the signal 264 for the drivers 242, 244 associated with the input circuit 204. In some examples, the control circuit may enable two of the drivers so that the enabled drivers generate and provide the controls signals to their associated MOSFETs, and disable the other drivers to prevent the disabled drivers from generating their controls signals.

In some examples, the MOSFETs Q1-Q8 include body diodes arranged in the same direction as the diodes D1-D4. In such examples, when MOSFETs (e.g., the MOSFETs Q1-Q4) of the active input circuit are on, body diode drops in the MOSFETs (e.g., the MOSFETs Q5-Q8) of the inactive input circuit may be substantially eliminated. For example, before the inactive input circuit can conduct current, it may be necessary for each of its diodes (e.g., the body diodes of the MOSFETs Q5-Q8 and the diodes D3, D4) to overcome a cut-in voltage threshold. As such, the inactive input circuit may conduct a minimal amount of current (if any) to the power conversion circuit. However, the inactive input circuit cannot compete in terms of passive current sharing with the active input circuit. This ensures the active input circuit supplies power through its MOSFETs thereby minimizing conduction losses.

Figure 3:
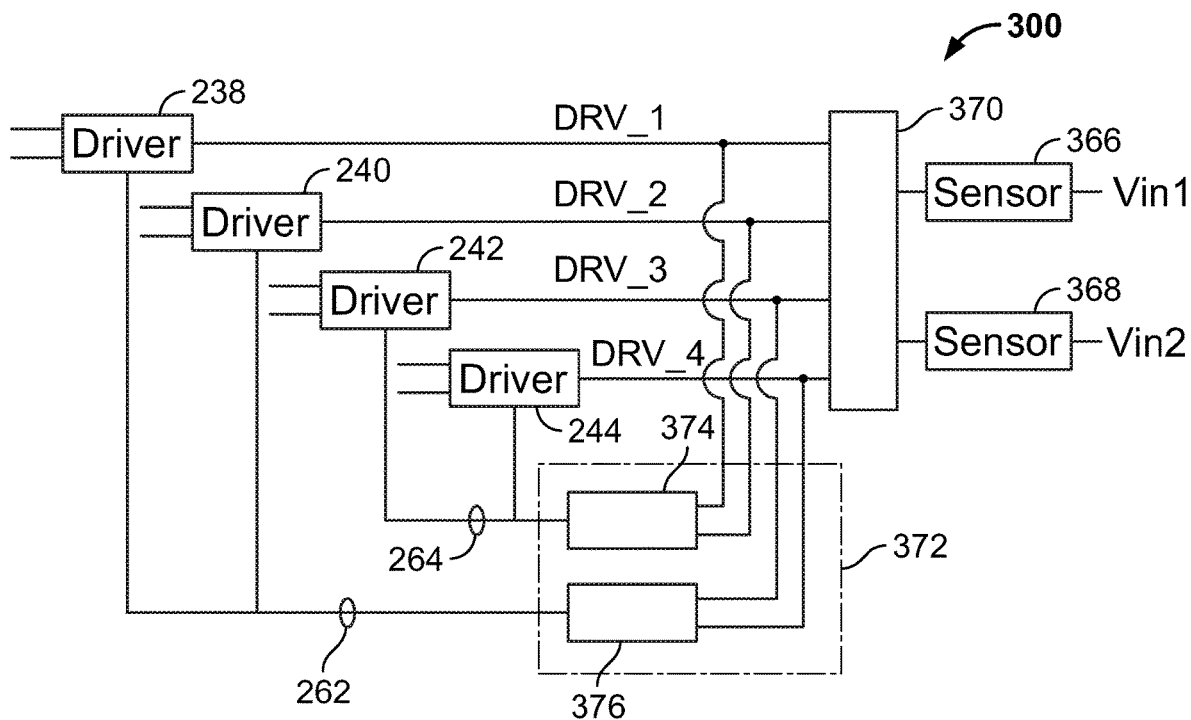
FIG. 3 is a block diagram of the control circuit of FIG. 2 including an interlock circuit, according to yet another example embodiment.

FIG. 3 illustrates a control circuit 300 employable in the back-feed protection circuit 200 of FIG. 2. Although the control circuit 300 is described with reference to the back-feed protection circuit 200 of FIG. 2, it should be apparent that the control circuit 300 may be employed in other suitable back-feed protection circuits including the back-feed protection circuits disclosed herein and/or the back-feed protection circuit 200 may include another suitable control circuit if desired.

As shown in FIG. 3, the control circuit 300 includes two isolated sensors 366, 368, a controller 370, the drivers 238, 240, 242, 244 of FIG. 2, and an interlock circuit 372. The sensors 366, 368 sense the DC input voltages Vin1, Vin2 of the input circuits 202, 204 of FIG. 2. The sensors 366, 368 may be any suitable voltage sensor such as a resistive voltage sensor.

The control circuit 300 controls which input circuit 202, 204 is enabled and disabled based on the sensed input voltages Vin1, Vin2. For example, and as shown in FIG. 3, the controller 370 receives signals representing the sensed input voltages Vin1, Vin2 from the sensors 366, 368. The controller 370 compares the sensed input voltages Vin1, Vin2 to determine which voltage is higher. Once determined, the controller 370 may alter the drive signals DRV_1, DRV_2, DRV_3, DRV_4 such that the drive signals associated with the input circuit having the higher input voltage are in a high state, and the drive signals associated with the input circuit having the lower input voltage are in a low state.

The interlock circuit 372 of FIG. 3 may be employed to enable and/or disable the drivers 238, 240 associated with the input circuit 202 of FIG. 2, and/or the drivers 242, 244 associated with the input circuit 204 of FIG. 2. In some examples, the interlock circuit 372 may disable the drivers (e.g., the drivers 238, 240) associated with one input circuit (e.g., the input circuit 202) when at least one of the drive signals (e.g., drive signals DRV_3, DRV_4) associated with the other input circuit (e.g., the input circuit 204) changes state. As such, if a fault occurs that causes one of the common drive signals (e.g., the drive signals DRV_1, DRV_2) associated with one input circuit (e.g., the input circuit 202) to unexpectedly change to a high state, the interlock circuit 372 disables the drivers (e.g., the drivers 242, 244) associated with the other input circuit (e.g., the input circuit 204).

Figure 4:
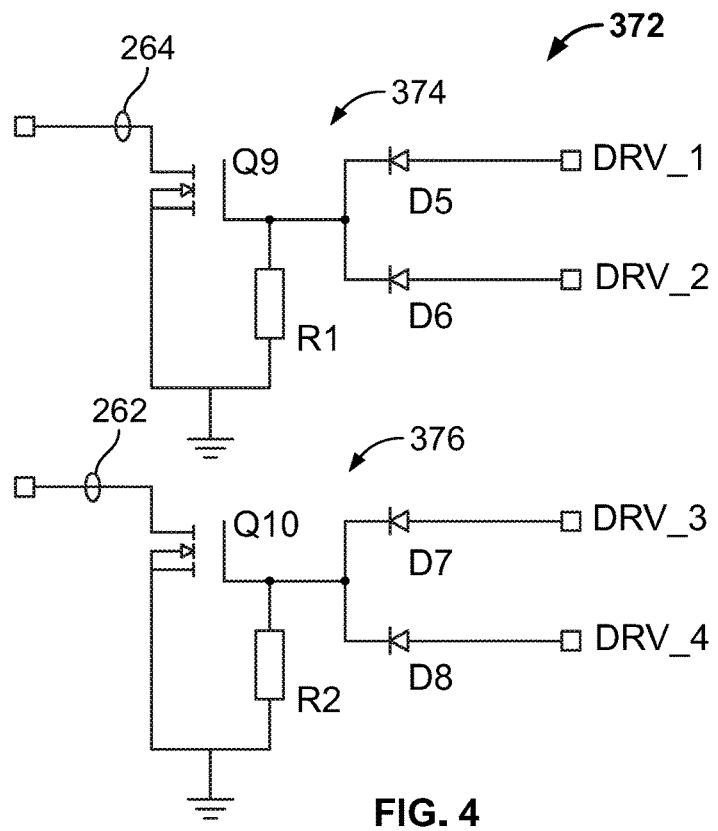
FIG. 4 is a schematic of the interlock circuit of FIG. 3, according to another example embodiment.

For example, and as shown in FIGS. 3 and 4, the interlock circuit 372 includes portions 374, 376 that generates the signals 262, 264 of FIG. 2 based on the drive signals DRV_1, DRV_2, DRV_3, DRV_4. As shown in FIG. 4, the portions 374, 376 each include two diodes D5, D6, D7, D8, a resistor R1, R2 and a switching device (e.g., a MOSFET) Q9, Q10. In such examples, the diodes D5, D6 of the portion 374 receive the common drive signals DRV_1, DRV_2 associated with the input circuit 202 of FIG. 2, and the diodes D7, D8 of the portion 376 receive the common drive signals DRV_3, DRV_4 associated with the input circuit 204 of FIG. 2.

If the common drive signals DRV_1, DRV_2 are low, the switching device Q9 is off and the drivers 242, 244 are enabled. In such examples, the signal 264 provided to the drivers 242, 244 may be biased high. However, if the common drive signal DRV_1 and/or the common drive signal DRV_2 changes to a high state, the switching device Q9 turns on due to the voltage drop across the resistor R1. As a result, the signal 264 may be pulled down (e.g., to a reference voltage such as ground) to disable the drivers 242, 244 associated with the input circuit 204 of FIG. 2.

Likewise, if the common drive signals DRV_3, DRV_4 are low, the switching device Q10 is off. In such examples, the signal 262 provided to the drivers 238, 240 may be biased high causing the drivers 238, 240 to be enabled. However, if the common drive signal DRV_3 and/or the common drive signal DRV_4 changes to a high state, the switching device Q10 turns on due to the voltage drop across the resistor R2. As a result, the signal 262 may be pulled down (e.g., to a reference voltage such as ground) to disable the drivers 238, 240 associated with the input circuit 202 of FIG. 2.

In other examples, the interlock circuit 372 of FIGS. 3 and 4 may include other suitable components and/or circuit configurations to ensure the drivers associated with one input circuit is disabled when the drive signals associated with the other input circuit changes state.

Figure 5:
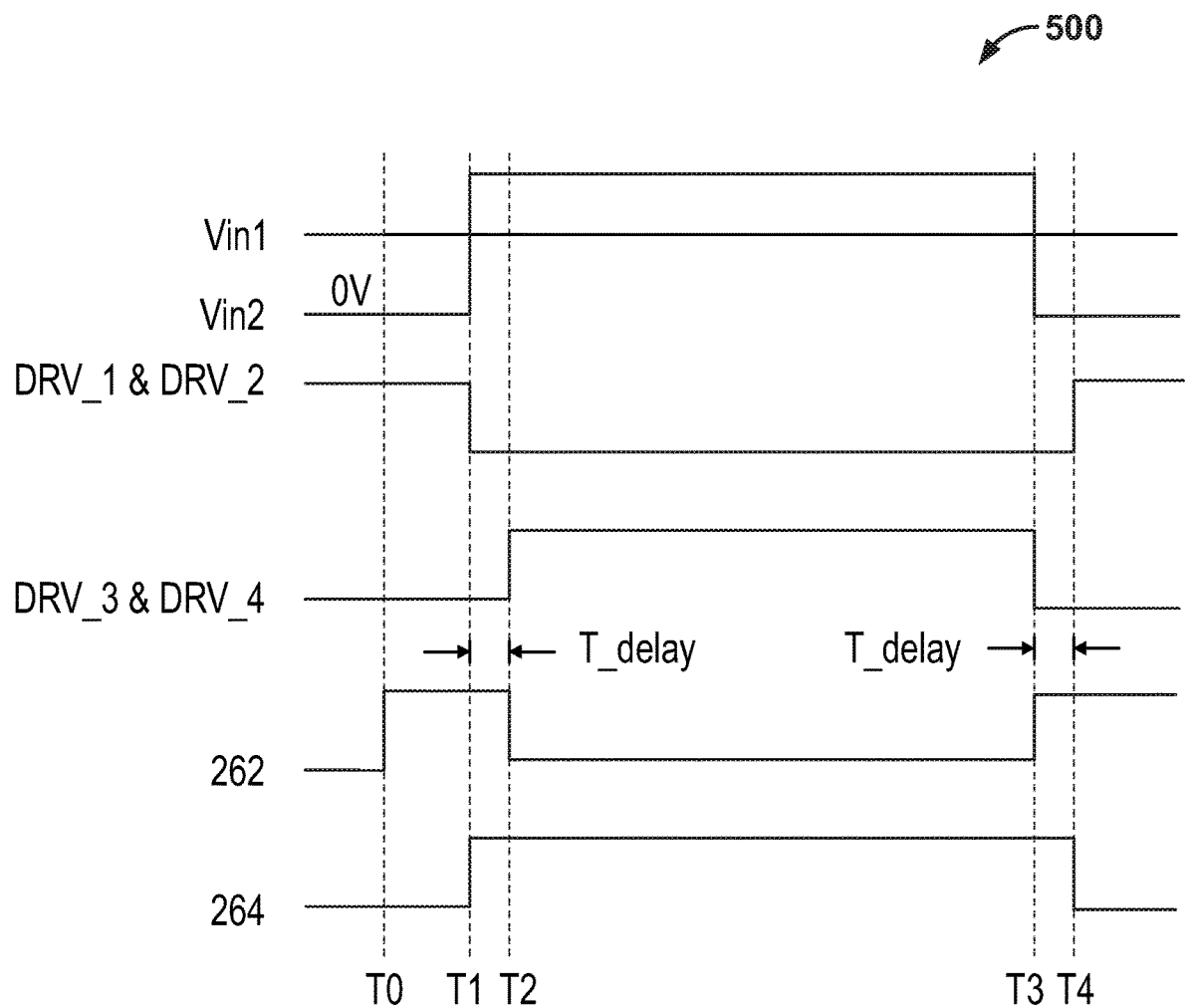
FIG. 5 is a timing diagram of signals generated by the control circuit of FIG. 3 according to yet another example embodiment.

FIG. 5 illustrates a timing diagram 500 associated with the control circuit 300 of FIG. 3 during normal operation. As shown in FIG. 5, the input voltage Vin2 is zero volts and the input voltage Vin1 is a value greater than zero at time T0. In such scenarios, the signal 262 from the interlock circuit 372 is high, the drive signals DRV_1, DRV_2 provided to the drivers 238, 240 are high, the signal 264 from the interlock circuit 372 is low, and the drive signals DRV_3, DRV_4 provided to the drivers 242, 244 are low.

At time T1, the input voltage Vin2 increases to a value greater than the input voltage Vin1. This causes the controller 370 to change the state of the drive signals DRV_1, DRV_2, DRV_3, DRV_4. For example, and as shown in FIG. 5, the drive signals DRV_1, DRV_2 provided to the drivers 238, 240 are changed to a low state, and the signal 264 is changed to a high state at time T1. Additionally, the drive signals DRV_3, DRV_4 provided to the drivers 242, 244 are changed to a high state, and the signal 262 is changed to a low state at time T2. In the particular example of FIG. 5, a time delay T_delay is employed between when the drive signals DRV_1, DRV_2 are changed to a low state and when the drive signals DRV_3, DRV_4 are changed to a high state. This ensures the MOSFETs Q1-Q4 associated with the drive signals DRV_1, DRV_2 are biased off before the MOSFETs Q5-Q8 associated with the drive signals DRV_3, DRV_4 are turned on.

At time T3, the input voltage Vin2 decreases to zero. This causes the causes the controller 370 to again change the state of the drive signals DRV_1, DRV_2, DRV_3, DRV_4. For example, and as shown in FIG. 5, the drive signals DRV_3, DRV_4 provided to the drivers 242, 244 are changed to a low state, and the signal 262 is changed to a high state at time T3. Additionally, the drive signals DRV_1, DRV_2 provided to the drivers 238, 240 are changed to a high state, and the signal 264 is changed to a low state at time T4. As shown, another time delay T_delay exists between T3 and T4 to ensure the MOSFETs Q5-Q8 associated with the drive signals DRV_3, DRV_4 are biased off before the MOSFETs Q1-Q4 associated with the drive signals DRV_1, DRV_2 are turned on.

Figure 6:
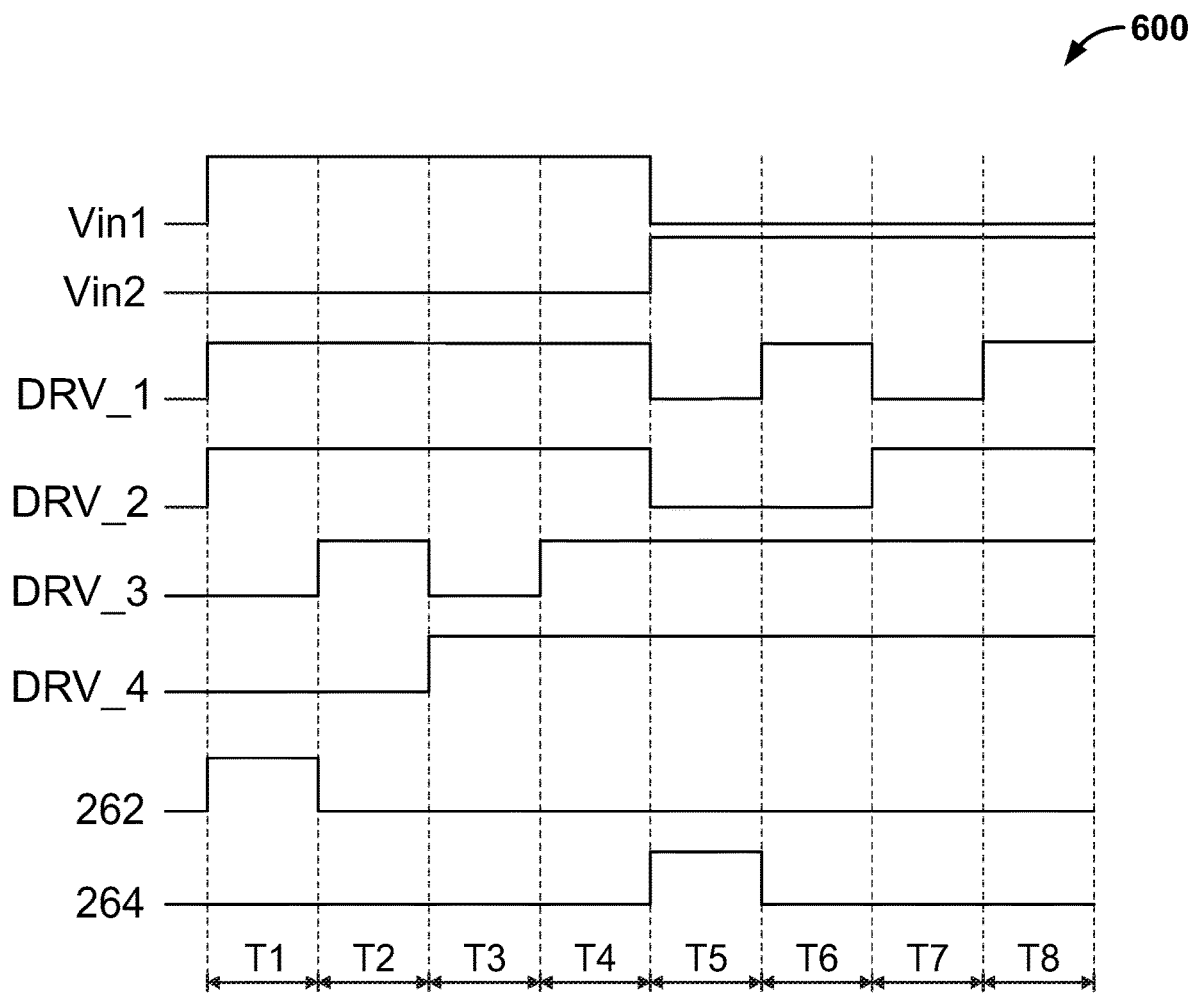
FIG. 6 is a timing diagram of signals generated by the control circuit of FIG. 3 during fault conditions, according to another example embodiment.

FIG. 6 illustrates a timing diagram 600 associated with the interlock circuit 372 of FIGS. 3 and 4 when faults occur. The back-feed protection circuit 200 of FIG. 2 is in a normal operation during a time period T1. For example, the input voltage Vin1 is greater than the input voltage Vin2. As such, the drive signals DRV_1, DRV_2 and the signal 262 are high. During a time period T2, a fault occurs causing the drive signal DRV_3 to change to a high state. This causes the interlock circuit 372 to automatically pull the signal 262 low (as explained above) thereby disabling the drivers 238, 240 even though the drive signals DRV_1, DRV_2 remain high. This is because the signal 262 is independent from the drive signals DRV_1, DRV_2, and capable of independently disabling the drivers 238, 240. As shown, the signal 264 remains low. As such, all of the drivers 238, 240, 242, 244 are disabled during the time period T2.

Additionally, a time period T3 represents when a fault occurs causing the drive signal DRV_4 to change to a high state, and a time period T4 represents when a fault occurs causing both of the drive signals DRV_3, DRV_4 to change to a high state. In such examples, the interlock circuit 372 maintains the signals 262, 264 in their low state to ensure all of the drivers 238, 240, 242, 244 remain disabled.

Time periods T5-T8 represent analogous fault conditions as the time period T1-T4 but where the input voltage Vin2 is greater than input voltage Vin1. For example, during the time period T6, a fault occurs causing the drive signal DRV_1 to change to a high state. This causes the interlock circuit 372 to automatically pull the signal 264 low (as explained above) thereby disabling the drivers 242, 244 even though the drive signals DRV_3, DRV_4 remain high. This is because the signal 264 is independent from the drive signals DRV_3, DRV_4, and capable of independently disabling the drivers 242, 244.

Figure 8:
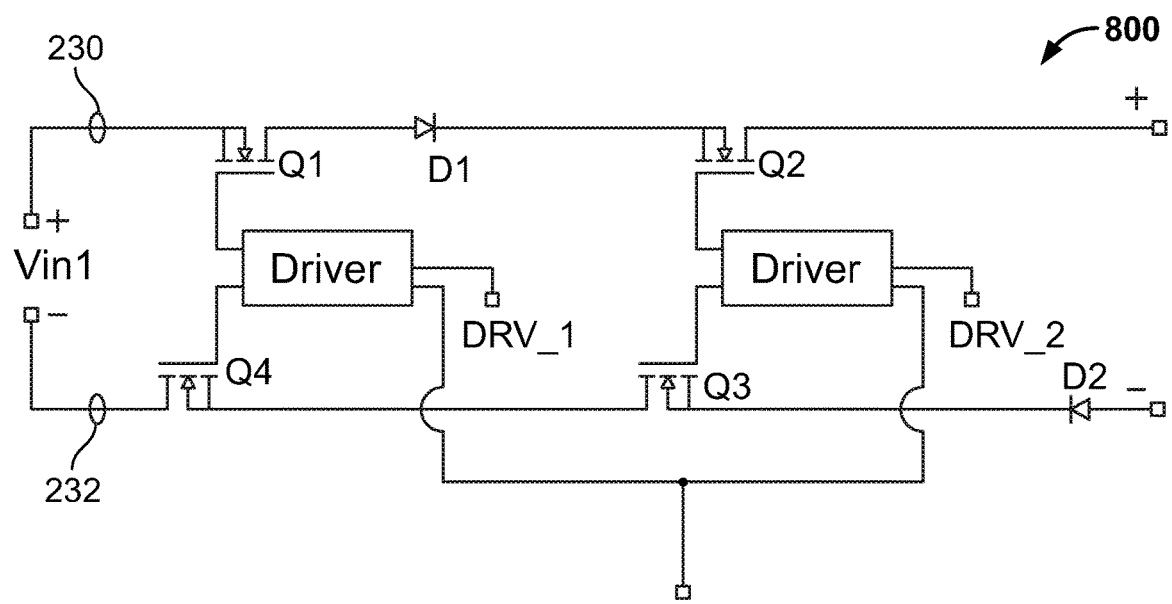
FIG. 8 is a schematic of one input circuit of a back-feed protection circuit including four MOSFETs and two diodes, according to another example embodiment.
Figure 9:
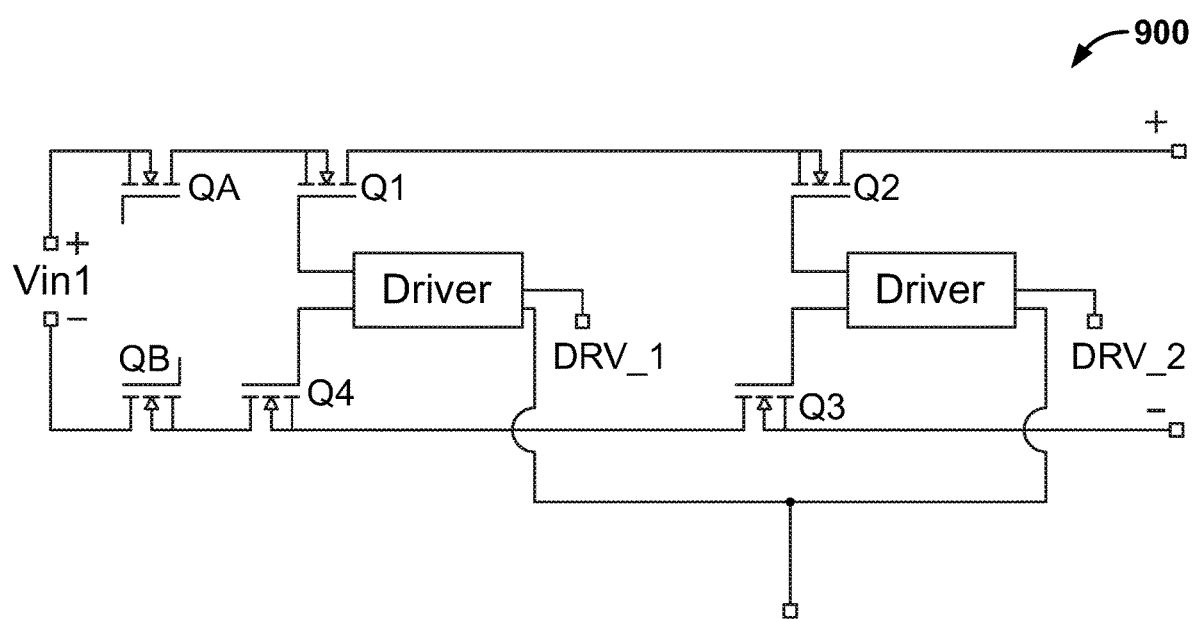
FIG. 9 is a schematic of one input circuit of a back-feed protection circuit including six MOSFETs, according to yet another example embodiment.

Although the back-feed protection circuit 200 of FIG. 2 includes a specific arrangement of its MOSFETs Q1-Q8, diodes D1-D4 and control circuit, it should be apparent to one skilled in the art that the MOSFETs Q1-Q8 and diodes D1-D4 may be arranged differently and/or replaced with other components with achieving the same result. For example, FIGS. 7-9 illustrates input circuits 700, 800, 900 each similar to the input circuit 202 of FIG. 2, but having different driver configurations, diode arrangements and/or replacement components.

Figure 7:
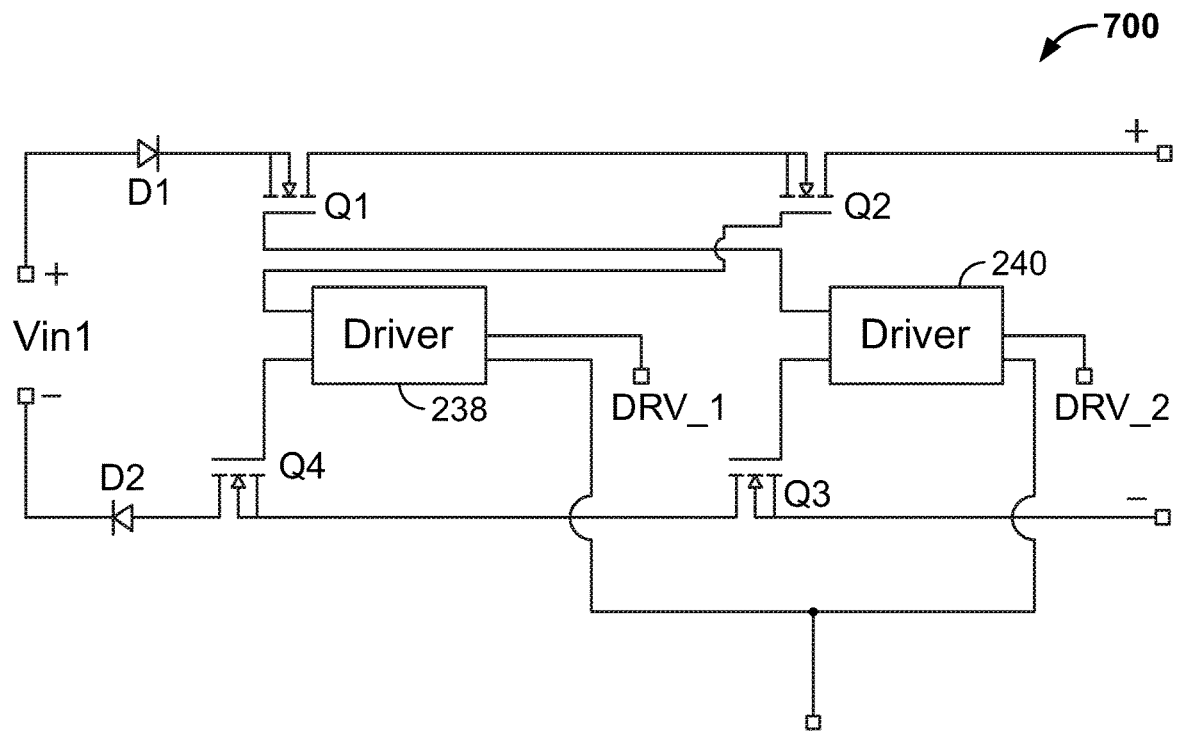
FIG. 7 is a schematic of one input circuit of a back-feed protection circuit including four MOSFETs, according to yet another example embodiment.

Specifically, in the example of FIG. 7, the driver 238 provides control signals to the MOSFETs Q2, Q4, and the driver 240 provides control signals to the MOSFETs Q1, Q3. As shown in FIG. 8, the diode D1 is coupled between the MOSFETs Q1, Q2 in the positive rail 230, and the diode D2 is coupled to a source of the MOSFET Q3 in the reference rail 232. Additionally, and as shown in FIG. 9, the diodes D1, D2 of FIG. 2 are replaced with MOSFETs QA, QB. In this example, another isolated driver may be added to turn on the MOSFETs QA, QB. The MOSFETs QA, QB (and the other MOSFETs disclosed herein) may be selected to have low channel on-resistance that produces minimal power dissipation.

Figure 10:
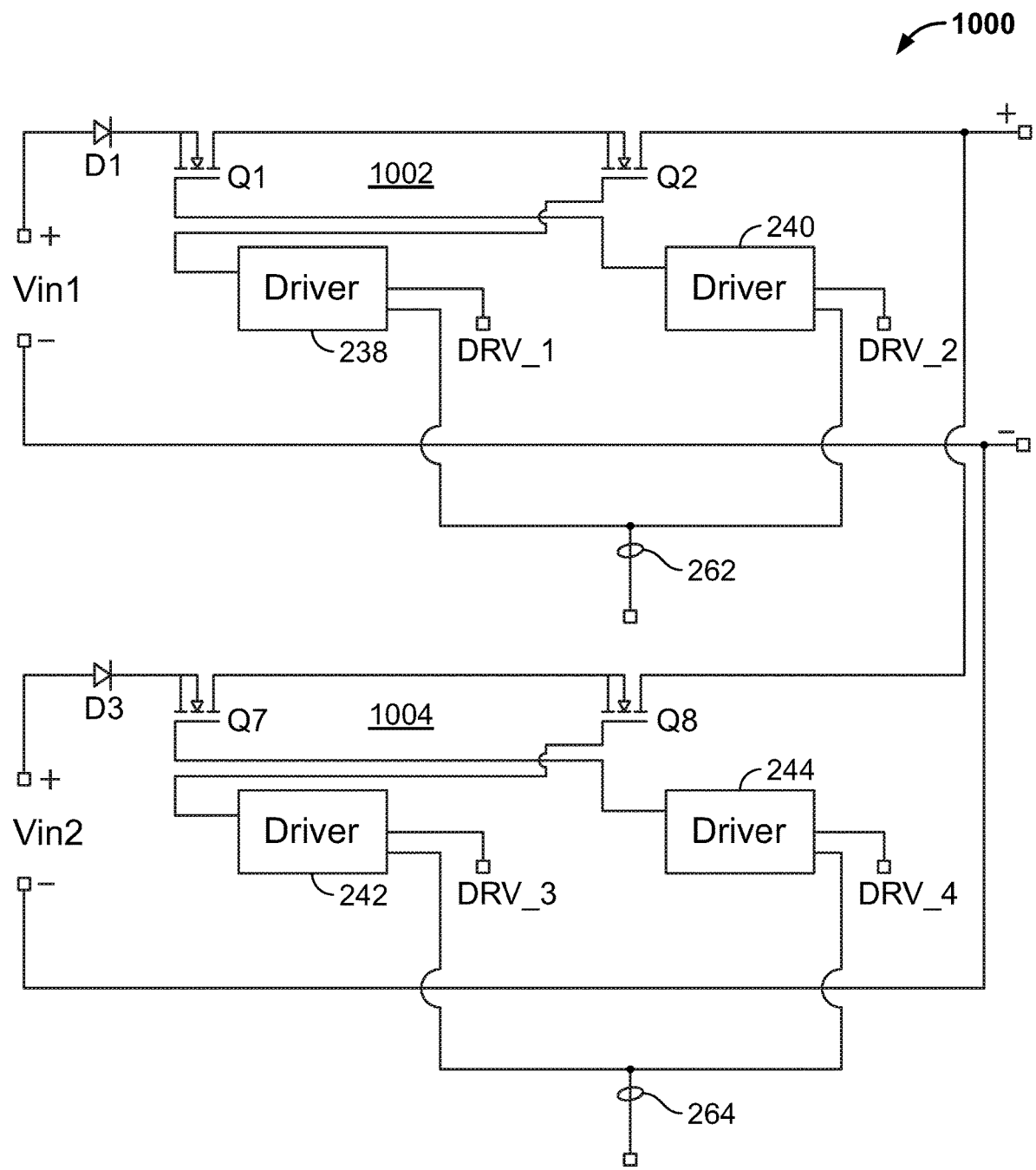
FIG. 10 is a schematic of a back-feed protection circuit including two redundant input circuits each having two MOSFETs and a diode in its positive rail according to another example embodiment.

In some examples, one or more of the switching devices of any one of the back-feed protection circuits disclosed herein may be removed. For example, FIG. 10 illustrates a back-feed protection circuit 1000 including redundant input circuits 1002, 1004 each similar to the input circuit 700 of FIG. 7. However, the redundant input circuits 1002, 1004 do not include switching devices in their reference rails. In such examples, the reference rails of the input circuits 1002, 1004 are tied together. As shown in FIG. 10, the input circuit 1002 includes the MOSFETs Q1, Q2 and the diode D1 coupled in series in its positive rail, and the input circuit 1004 includes the MOSFETs Q7, Q8 and the diode D3 coupled in series in its positive rail.

Additionally, the back-feed protection circuit 1000 of FIG. 10 includes a control circuit coupled to the input circuits 1002, 1004 for controlling the MOSFETs Q1, Q2, Q7, Q8. For example, and as shown in FIG. 10, the control circuit includes the four isolated drivers 238, 240, 242, 244 of FIG. 2 for controlling the MOSFETs Q1, Q2, Q7, Q8. In the particular example of FIG. 10, the driver 238 receives the drive signal DRV_1 and provides a control signal for controlling the MOSFET Q2, the driver 240 receives the drive signal DRV_2 and provides a control signal for controlling the MOSFET Q1, the driver 242 receives the drive signal DRV_3 and provides a control signal for controlling the MOSFET Q8, and the driver 244 receives the drive signal DRV_4 and provides a control signal for controlling the MOSFET Q7.

The MOSFETs Q1, Q2, Q7, Q8 and the drivers 238, 240, 242, 244 of FIG. 10 may be controlled the same manner as other MOSFETs and drivers disclosed herein. For example, the drive signals DRV_1, DRV_2, DRV_3, DRV_4 may be altered based on the input DC voltages Vin1, Vin2, as explained above. Additionally, the control circuit of FIG. 10 may generate the signals 262, 264 for enabling and/or disabling the drivers 238, 240, 242, 244 as explained above.

Figure 11:
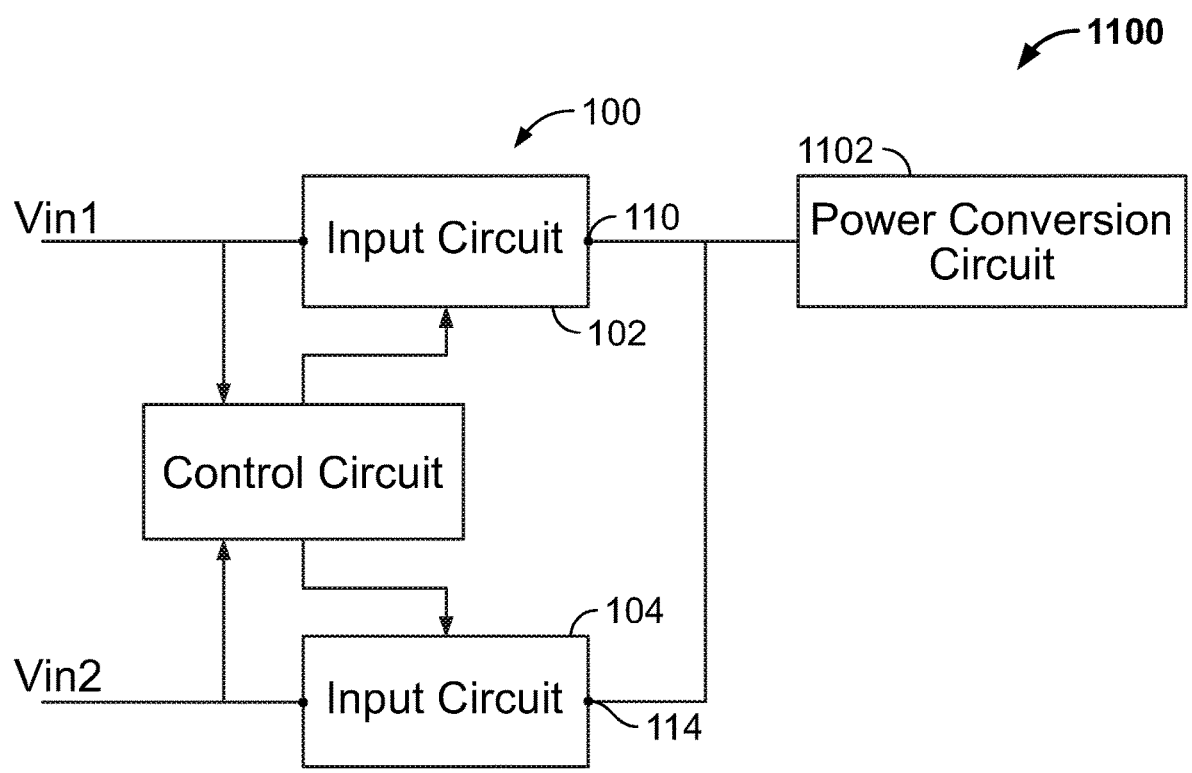
FIG. 11 is a block diagram of an electric power supply including the back-feed protection circuit of FIG. 1 and a power conversion circuit, according to another example embodiment.

Any one of the back-feed protection circuits disclosed herein may be employed in an electric power supply. For example, FIG. 11 illustrates an electric power supply 1100 including the back-feed protection circuit 100 of FIG. 1, and a power conversion circuit 1102. As shown in the particular example of FIG. 11, the output 110 of the input circuit 102 and the output 114 of the input circuit 104 are coupled in parallel, and the power conversion circuit 1002 is coupled to the outputs 110, 114. Although not shown, the power supply 1100 may optionally include a rectifier at its input for feeding one or both input circuits 102, 104.

In some examples, the redundant input circuits 102, 104 may include switching devices coupled in their positive rails and reference rails, as explained above. For example, each of the redundant input circuits 102, 104 may include at least two MOSFETs and at least one diode in its positive rail, and at least two MOSFETs and at least one diode in its reference rail, as explained above. Additionally, the control circuit 106 may include drivers and an interlock circuit arranged similar to the drivers 238, 240, 242, 244 and the interlock circuit 372 of FIGS. 2-4.

The power conversion circuit 1002 and the other power conversion circuits disclosed herein may include DC-DC power converters, DC-AC power converters, etc. having a suitable topology. For example, the power conversion circuits may include a buck, boost, buck-boost, half-bridge, full-bridge, etc. topology.

The back-feed protection circuits disclosed herein may be employed in electric power supplies for varies different applications such as data centers, telecommunications facilities, etc. In some examples, the back-feed protection circuits may be employed in electric power supplies requiring back-feed protection and/or ORing functionalities. Additionally, the back-feed protection circuits may be useful in electric power supplies having high voltage DC redundant inputs where input voltages exceed a level (e.g., 60 VDC, etc.) specified by Safety Extra Low Voltage (SELV). For instance, the input voltages may range between 260 VDC-400 VDC. In other examples, the input voltages may be more than 400 VDC or less than 260 VDC. Further, the back-feed protection circuits may be employed in electric power supplies having different input configuration such as +V earthed common negative terminal configurations, earthed high-ohmic midpoint terminal configurations, etc. as explained in the European Standard (EN) 301605 provided by the European Telecommunications Standards Institute (ESTI).

Additionally, although the back-feed protection circuits disclosed herein include only two redundant input circuits, it should be apparent to those skilled in the art that the back-feed protection circuits may employ more than two input circuits. In such examples, the input circuit having the highest input voltage may be active while the remaining input circuits may be inactive.

Any one of the control circuits disclosed herein may include an analog control circuit, a digital control circuit, or a hybrid control circuit (e.g., a digital control unit and an analog circuit). Additionally, the entire control circuit, some of the control circuit, or none of the control circuit may be positioned on an integrated circuit (IC). For example, each driver disclosed herein may be positioned on its own IC.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

The digital control circuits may be implemented with one or more types of digital control circuitry. For example, the digital control circuits each may include a digital signal controller (DSC), a digital signal processor (DSP), a microcontroller unit (MCU), a field-programmable gate array (FPGA), etc. For example, the controller 370 of FIG. 3 may be a DSP, a MCU, etc.

By employing one or more of the features disclosed herein, back-feed protection may be achieved in various fault conditions, such as double fault conditions. For example, by using common drive signals for drivers controlling switching devices in an input circuit's positive rail and reference rail, the control circuits disclosed herein may address fault conditions of when the drive signals fail high. Additionally, the control circuits may employ crisscross enabling features such that the drivers of one input circuit are automatically disabled when drive signals for switching devices of the other input circuit change state (e.g., change to a high state). This feature may address fault conditions of when outputs (e.g., IC pins, etc.) of the control circuits fail high. In such conditions, the control circuits may disable all drivers. As such, the back-feed protection features address conditions of a single failure of a common drive signal and a second failure of any one of the series coupled switching devices in the positive or reference rail, while maintaining at least one reverse blocking element in such double fault conditions. Thus, back-feed protection may be maintained throughout signal fault conditions and double fault conditions.

The features of the back-feed protection circuits disclosed herein provide additional advantages over conventional back-feed protection circuits. For example, the back-feed protection circuits have a more compact package, reduced components, etc. as compared to conventional back-feed protection circuits having, e.g., relays, MOSFETs with individual controllers, etc. Additionally, the back-feed protection circuits do not require bulk capacitors having large hold-up capabilities to sustain the power supply's output as is used in conventional systems when transferring from one input circuit to another input circuit. Further, the back-feed protection circuits may use less drive power when driving the switching devices (e.g., MOSFETs) and experience reduced power dissipation as compared to conventional systems employing relays, diodes, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric power supply comprising:
   a first input circuit including a positive rail, a reference rail and a plurality of first switching devices, the positive rail and the reference rail of the first input circuit defining an input for receiving a first input DC voltage, the plurality of first switching devices including a first set of switching devices coupled in series in the positive rail of the first input circuit, and a second set of switching devices coupled in series in the reference rail of the first input circuit;
   a second input circuit including a positive rail, a reference rail and a plurality of second switching devices, the positive rail and the reference rail of the second input circuit defining an input for receiving a second input DC voltage, the plurality of second switching devices including a first set of switching devices coupled in series in the positive rail of the second input circuit, and a second set of switching devices coupled in series in the reference rail of the second input circuit;
   a power conversion circuit coupled to the first input circuit and the second input circuit; and
   a control circuit coupled for controlling the plurality of first switching devices and the plurality of second switching devices, the control circuit configured to sense the first input DC voltage and the second input DC voltage, enable one of the first input circuit and the second input circuit having the highest input DC voltage, and disable the other one of the first input circuit and the second input circuit to substantially prevent current from back feeding to the first input circuit and/or the second input circuit.

2. The electric power supply of claim 1 wherein the control circuit is configured to generate a first set of drive signals and a second set of drive signals, and wherein the control circuit includes a first set of drivers coupled for controlling the plurality of first switching devices based on the first set of drive signals, and a second set of drivers coupled for controlling the plurality of second switching devices based on the second set of drive signals.

3. The electric power supply of claim 2 wherein the control circuit is configured to generate a signal for enabling the first set of drivers or the second set of drivers associated with said one of the first input circuit and the second input circuit having the highest input DC voltage, and a signal for disabling the first set of drivers or the second set of drivers associated with said other one of the first input circuit and the second input circuit.

4. The electric power supply of claim 2 wherein the control circuit is configured to disable the first set of drivers based on a drive signal of the second set of drive signals changing state, or wherein the control circuit is configured to disable the second set of drivers based on a drive signal of the first set of drive signals changing state.

5. The electric power supply of claim 1 wherein the first set of switching devices of the first input circuit include at least two MOSFETs, and the second set of switching devices of the first input circuit include at least two MOSFETs, and/or wherein the first set of switching devices of the second input circuit include at least two MOSFETs, and the second set of switching devices of the second input circuit include at least two MOSFETs.

6. The electric power supply of claim 5 wherein the first set of switching devices of the first input circuit include at least one diode, and the second set of switching devices of the first input circuit include at least one diode, and/or wherein the first set of switching devices of the second input circuit include at least one diode, and the second set of switching devices of the second input circuit include at least one diode.

7. The electric power supply of claim 1 wherein the control circuit includes a set of drivers coupled for controlling the plurality of first switching devices, wherein one driver of the set of drivers is configured to control one switching device of the first set of switching devices and one switching device of the second set of switching devices, and wherein another driver of the set of drivers is configured to control another switching device of the first set of switching devices, and another switching device of the second set of switching devices.

8. A back-feed protection circuit for coupling to a power conversion circuit, the back-feed protection circuit comprising:
 a first input circuit including a positive rail, a reference rail and a plurality of first MOSFETs, the plurality of first MOSFETs including a first set of MOSFETs coupled in series in the positive rail of the first input circuit, and a second set of MOSFETs coupled in series in the reference rail of the first input circuit;
 a second input circuit including a positive rail, a reference rail and a plurality of second MOSFETs, the plurality of second MOSFETs including a first set of MOSFETs coupled in series in the positive rail of the second input circuit, and a second set of MOSFETs coupled in series in the reference rail of the second input circuit; and
 a control circuit coupled to the first input circuit and the second input circuit for controlling the plurality of first MOSFETs and the plurality of second MOSFETs, the control circuit configured to enable the first input circuit or the second input circuit by turning on the plurality of first MOSFETs or the plurality of second MOSFETs, and disable the other one of the first input circuit and the second input circuit to substantially prevent current from back feeding to the first input circuit and/or the second input circuit.

9. The back-feed protection circuit of claim 8 wherein the first input circuit includes an input for receiving a first input DC voltage, wherein the second input circuit includes an input for receiving a second input DC voltage, and wherein the control circuit is configured to sense the first input DC voltage and the second input DC voltage and enable said one of the first input circuit and the second input circuit having the highest input DC voltage.

10. The back-feed protection circuit of claim 9 wherein the control circuit is configured to generate a first set of drive signals and a second set of drive signals, and wherein the control circuit includes a first set of drivers coupled for controlling the plurality of first MOSFETs based on the first set of drive signals, and a second set of drivers coupled for controlling the plurality of second MOSFETs based on the second set of drive signals.

11. The back-feed protection circuit of claim 10 wherein the first set of drivers includes a driver configured to control one MOSFET of the first set of MOSFETs and one MOSFET of the second set of MOSFETs, and another driver configured to control another MOSFET of the first set of MOSFETs, and another MOSFET of the second set of MOSFETs.

12. The back-feed protection circuit of claim 10 wherein the control circuit is configured to generate a signal for enabling the first set of drivers or the second set of drivers associated with said one of the first input circuit and the second input circuit having the highest input DC voltage, and a signal for disabling the first set of drivers or the second set of drivers associated with said other one of the first input circuit and the second input circuit.

13. The back-feed protection circuit of claim 12 wherein the control circuit is configured to disable the first set of drivers in response to a drive signal of the second set of drive signals changing state, or wherein the control circuit is configured to disable the second set of drivers in response to a drive signal of the first set of drive signals changing state.

14. The back-feed protection circuit of claim 8 wherein the first input circuit includes a diode coupled to the first set of MOSFETs and another diode coupled to the second set of MOSFETs.

15. A back-feed protection circuit for coupling to a power conversion circuit, the back-feed protection circuit comprising:
 a first input circuit including an input for receiving a first input DC voltage;
 a second input circuit including an input for receiving a second input DC voltage; and
 a control circuit coupled for controlling the first input circuit and the second input circuit, the control circuit configured to sense the first input DC voltage and the second input DC voltage, enable one of the first input circuit and the second input circuit having the highest input DC voltage, and disable the other one of the first input circuit and the second input circuit to substantially prevent current from back feeding to the first input circuit and/or the second input circuit.

16. The back-feed protection circuit of claim 15 wherein the first input circuit includes a positive rail, a reference rail and a set of switching devices coupled in series in the positive rail of the first input circuit, and wherein the second input circuit includes a positive rail, a reference rail and a set of switching devices coupled in series in the positive rail of the second input circuit.

17. The back-feed protection circuit of claim 16 wherein the set of switching devices of the first input circuit include at least two MOSFETs and at least one diode, and wherein the set of switching devices of the second input circuit include at least two MOSFETs and at least one diode.

18. The back-feed protection circuit of claim 16 wherein the control circuit includes a first set of drivers coupled for controlling the set of switching devices of the first input circuit, and a second set of drivers coupled for controlling the set of switching devices of the second input circuit, and wherein the control circuit is configured to generate a signal for enabling the first set of drivers or the second set of drivers associated with said one of the first input circuit and the second input circuit having the highest input DC voltage, and a signal for disabling the first set of drivers or the second set of drivers associated with said other one of the first input circuit and the second input circuit.

19. The back-feed protection circuit of claim 18 wherein the first set of drivers includes a driver configured to control one switching device of the set of switching devices of the first input circuit, and another driver configured to control another switching device of the set of switching devices of the first input circuit.

20. The back-feed protection circuit of claim 18 wherein the control circuit is configured to disable the first set of drivers based on a drive signal provided by any one of the second set of drivers changing state, or wherein the control circuit is configured to disable the second set of drivers based on a drive signal provided by any one of the first set of drivers changing state.

21. The back-feed protection circuit of claim 18 wherein the first input circuit includes another set of switching devices coupled in series in the reference rail of the first input circuit, wherein the first set of drivers are coupled for controlling said other set of switching devices of the first input circuit, wherein the second input circuit includes another set of switching devices coupled in series in the reference rail of the second input circuit, and wherein the second set of drivers are coupled for controlling said other set of switching devices of the second input circuit.

* * * * *